M. KLAIBER.
PICTURE PROJECTING APPARATUS.
APPLICATION FILED JULY 16, 1908.
968,667.
Patented Aug. 30, 1910.
3 SHEETS—SHEET 3.
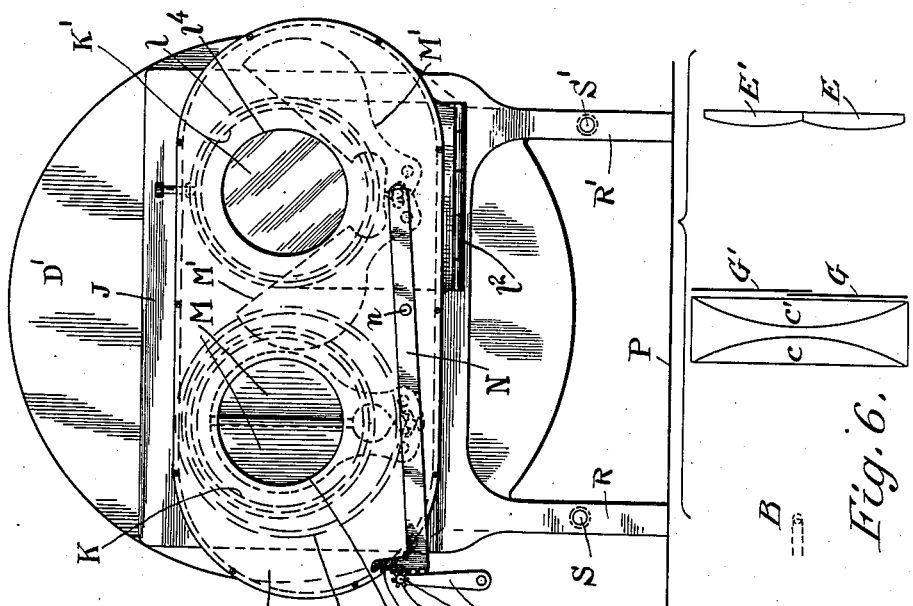
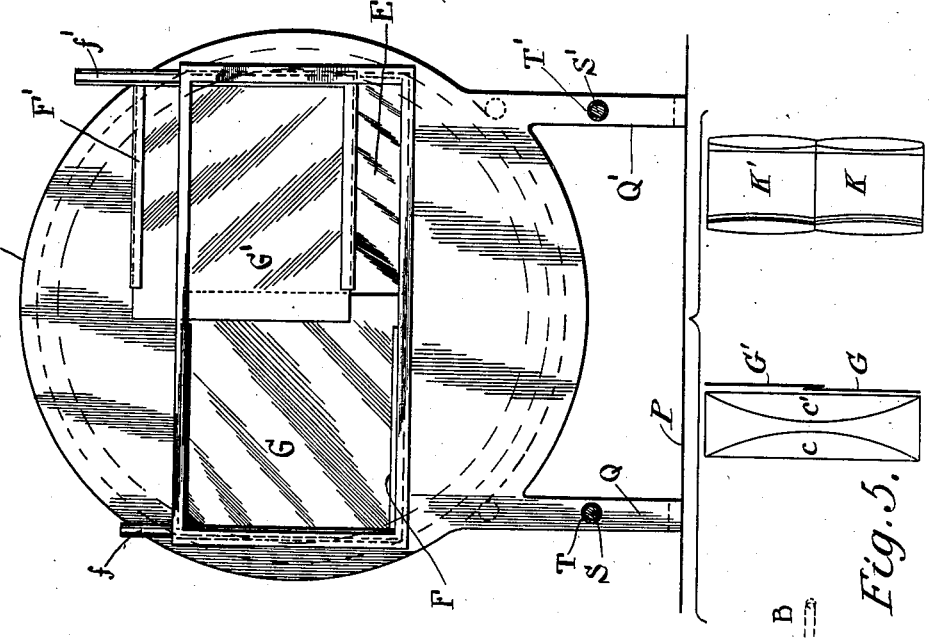

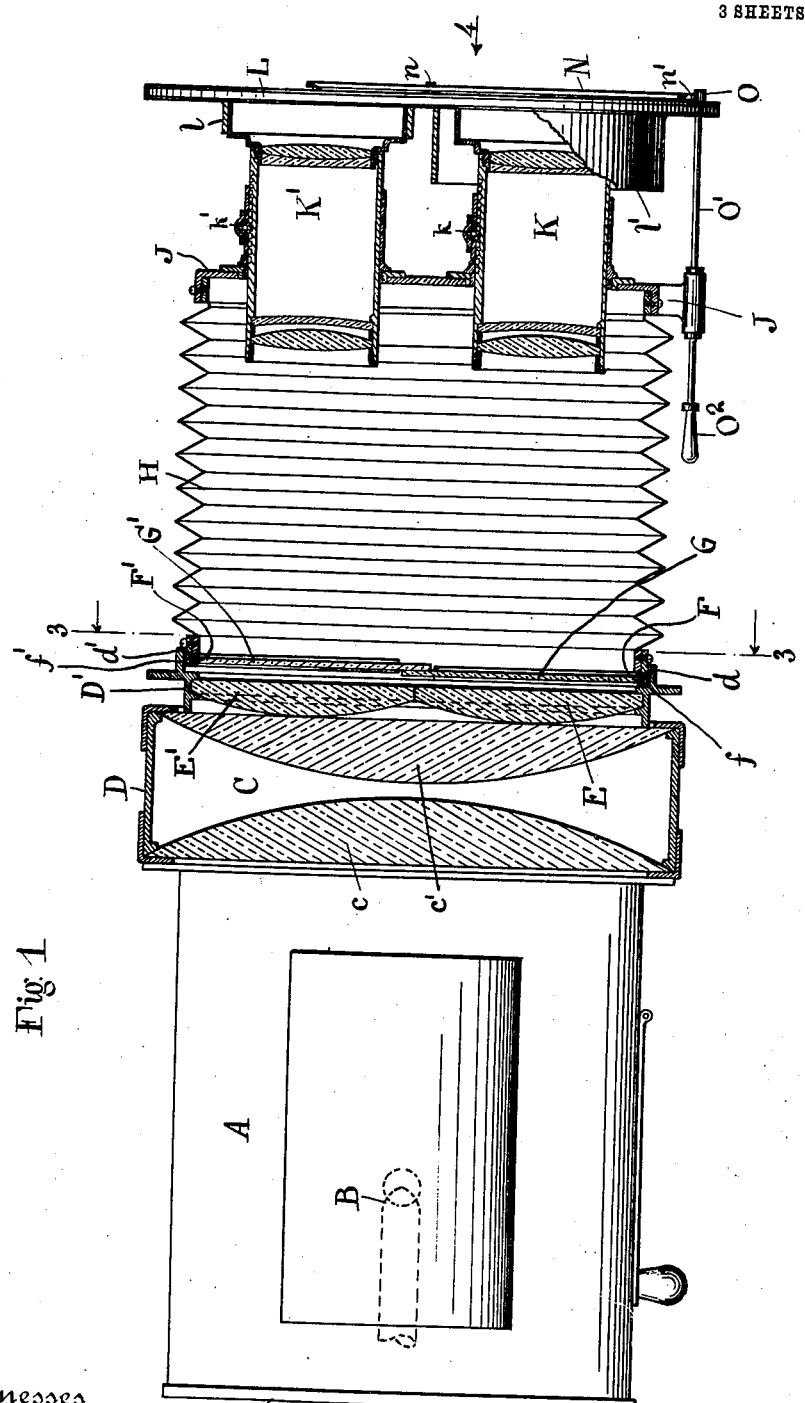

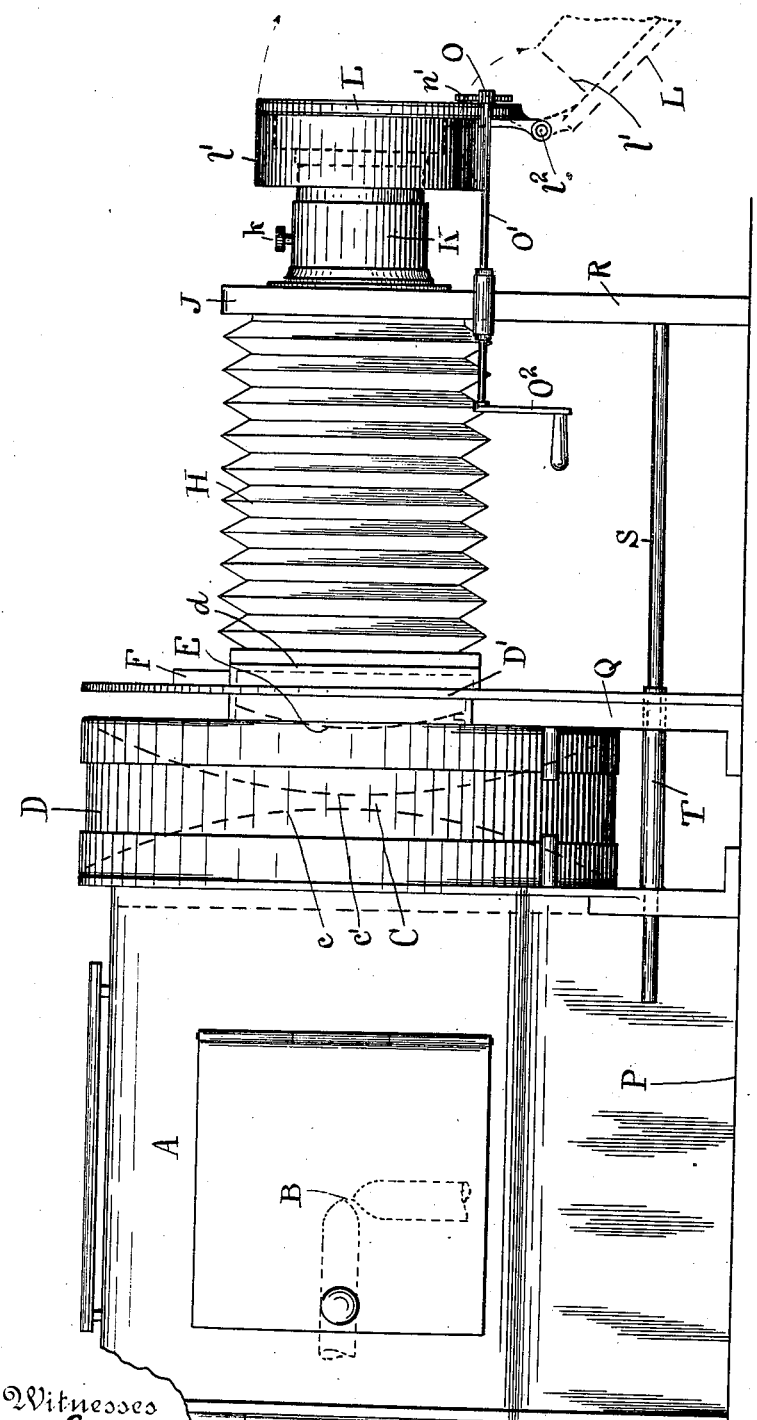

UNITED STATES PATENT OFFICE.

MAXIMILIAN KLAIBER, OF BROOKLYN, NEW YORK, ASSIGNOR TO THE MODERN IMPROVEMENTS MANUFACTURING COMPANY, OF BROOKLYN, NEW YORK, A CORPORATION OF NEW YORK.

PICTURE-PROJECTING APPARATUS.

968,667.  Specification of Letters Patent.  Patented Aug. 30, 1910.

Application filed July 16, 1908. Serial No. 443,805.

*To all whom it may concern:*

Be it known that I, MAXIMILIAN KLAIBER, a citizen of the United States, and a resident of the city of Brooklyn, county of Kings, and State of New York, have invented certain new and useful Improvements in Picture-Projecting Apparatus, of which the following is a specification.

My invention relates to that class of projecting apparatus in which the picture, colored or printed matter is projected on a screen or other background, one view or picture dissolving into the other as the projecting lenses are covered and uncovered.

The principal object which I have in view is the production of a picture projecting apparatus which may be most inexpensively produced and may be operated at a minimum cost for power and without requiring the attendance of a high priced skilled operator and at the same time will produce sharp and clear pictures. This object is attained by the use of a single source of light located out of focus with a suitable condenser which is preferably arranged between said source of light and the picture to be projected, and more particularly by arranging the single source of light between the condenser and the point of focus thereof; the invention being fundamentally founded more especially upon my discovery that by so locating the source of light, in an apparatus having suitable projecting means, I am enabled to construct a dissolving lantern which will produce sharp and clear pictures by the use of a single source of light and a plurality of sets of lenses or projecting apparatus.

The invention further consists in an apparatus having projecting lenses, a condenser and a single source of light arranged out of focus with the condenser, said apparatus also having a plurality of picture carrying slides whereby sharp and clear pictures dissolving one into another may be produced by the use of a single source of light.

The invention also consists in certain novel constructions and arrangements of parts substantially as hereinafter set forth and particularly pointed out in the subjoined claims.

In carrying out my invention I prefer to use a single electric arc light of any well known construction, but other forms of light may be used. I mount this light in a lantern or casing having a condenser connected to the front end thereof, by which the diverging rays of light are collected and through which they pass in parallel or substantially parallel lines. In the preferred form this condenser is of the ordinary two lens type and the source of light is located between the condenser and the point of focus thereof. I locate in proper working proximity to the condenser, a plurality of converging lenses, the whole constituting a composite condenser.

In front of the converging lenses is placed a plurality of ordinary projecting lenses arranged so as to receive light from the condenser. These lenses can be provided with shutters to alternately cover and uncover the same when successive pictures are to be thrown on the screen, or all the lenses may be uncovered to superimpose pictures on the screen. The picture or view to be projected is placed in front of each converging lens. In some cases I may dispense with the converging lenses, but when this is done the diameter of the projecting lenses must be greatly enlarged, and of course, at an increased cost of construction of the apparatus. In certain instances I may also dispense with the projecting lenses and use in place thereof the converging lenses, but in this sconstruction the picture thrown on the screen is not so "sharp."

With such constructions and arrangements of the apparatus as hereinabove referred to, I find that with a single light or source of light a plurality of pictures can be used and two or more may be projected and superimposed upon a screen or background at the same time, or the pictures may be successively thrown on the screen, one dissolving into the other.

Certain constructions of the apparatus are illustrated in the accompanying drawings, in which:

Figure 1 is a horizontal section of the apparatus except the lantern, which is shown in plan. Fig. 2 is a side elevation. Fig. 3 is a cross section on line 3 of Fig. 1, showing the pictures or slide carriers with the supplemental converging lenses just back of the same. Fig. 4 is a front elevation showing the end of the projecting lenses with the shutter case and shutters. Fig. 5 is a diagrammatic view of a modification in which the converging lens shown in Fig. 1 is dispensed with. Fig. 6 is a modification showing the converging lenses substituted for the projecting lenses of Fig. 5.

The preferred form of apparatus is illustrated in the first four figures of the drawing, and this apparatus I will now proceed to describe in detail.

The part marked A on the drawing represents a lantern with an electric light B mounted therein.

C is a condenser consisting of two plano-convex lenses $c$, $c'$ mounted in a frame D connected to the front end of the lantern A. The light B is located out of focus and between the condenser and the point of focus thereof. I have shown the light nearer to the point of focus than to the condenser, but the best results are obtained by placing the source of light about midway between the condenser and the focus.

E, E' represent converging lenses located in front of and in proximity to the main condenser with their convex sides toward the plane face of the lens $c'$, the inner edges of these converging lenses being cut or ground away to make a close joint or fit, as more clearly shown in Fig. 1 of the drawing and so that the axis of the lens will be on the same line as the axis of its corresponding projecting lens. These converging lenses are mounted in a frame D' which may be a part of the frame D or may be a separate frame connected thereto. The lenses $c$, $c'$ and the supplementary converging lenses E, E' form a composite condenser.

The frame D' is provided with rearwardly projecting members or flanges $d$, $d'$, to receive the carriers F, F', which hold the lantern slides or pictures G, G'. These carriers are provided with grooves or channels $f$, $f'$, into which project the flanges $d$, $d'$ when the carriers are in position. The flanges $d$, $d'$ are so arranged that when the carriers are in position, one of said carriers is slightly in advance of the other, and the inner edges of the slides or pictures overlap, as shown in Figs. 1 and 3 of the drawing. This construction and arrangement permits the pictures to be properly positioned for accurate projection on the screen.

Where the term picture carrier is used in the claims it is to be understood to mean any carrier holding a picture or lantern slide consisting of a glass, film or other material carrying a picture.

H designates a bellows of ordinary construction which is suitably mounted in front of the lenses described. To the front end of this bellows is secured a frame J to which are suitably connected the projecting lenses K, K', which are adjustable for focusing by the usual rack and pinion construction. This adjusting means is well known and not an essential part of my invention, and therefore, I do not consider it to be necessary to show or describe it in detail, but I have shown portions of it at $k$, $k'$ in Fig. 1.

On the front end of the projecting lenses is mounted a shutter casing L which is provided with rearwardly projecting flanges $l$, $l'$, which fit over the front ends of the projecting lenses K, K'. The flange $l$ is secured to the lens K by any suitable means so that the shutter casing may be readily removed. The other flange $l'$ which fits over the lens K' is larger in diameter than the lens to permit the casing K to be turned down away from the lens to uncover both the lenses at the same time. In order to turn down the casing L as stated, it is connected to the flange $l$ by a hinge $l^2$. This shutter casing is provided with openings $l^3$ $l^4$. Mounted in the casing and in front of each projecting lens is a pair of blades forming the shutters M, M'. These shutters are connected together by a lever N which is pivoted to the casing at $n$ in such manner that by operating the lever one of the shutters is moved to cover its lens, while the other shutter is moved to uncover its lens. The end of the lever N is provided with a rack $n'$. Meshing with this rack is a pinion O carried on a shaft or rod O' operated by a lever O². By rocking this rod the lever N is moved on its pivot to operate the shutters.

While I have shown two supplemental converging lenses and two projecting lenses, it is to be understood that I am not limited to this number, as several converging lenses corresponding to the number of projecting lenses may be used in conjunction with one main condenser. Any other form of shutters and means for operating the same other than what is shown and described may be used. Instead of placing the shutters in front of the projecting lenses, they may be placed in any other position in relation to said lenses so that the light thrown on the screen may be alternately cut off. As a matter of fact, in some instances, the lenses may be covered and uncovered by the ordinary cap in the hands of the operator.

While I have shown a bellows connecting the condenser frame D of the projecting lens frame J, it is to be understood that the bellows may be dispensed with.

The apparatus described is mounted on a support P, the frames D and J being provided with downwardly extending legs Q, Q' and R, R' respectively, which rest on said support P. To guide the lens frame J as it is adjusted toward or from the condenser, I have provided the legs Q, Q' with rearwardly extending rods S, S' which work in sleeves T, T'.

The construction hereinabove described operates as follows: The light B being out of focus with the condenser, the diverging rays of light as they strike the condenser will be transmitted thereby in substantially parallel lines. These rays of light on passing through the lenses E, E′ are converged. The light then passes through the slides or pictures G, G′, which are projected through the corresponding lenses K, K′, and are thrown on the screen if the said projecting lenses are uncovered. By a proper adjustment of the position of the slides relative to the lenses and proper manipulation of the shutters, the pictures are thrown on the screen, either superimposed or as independent pictures, one at a time. To show independent, superimposed pictures at the same time, both the lenses K, K′ are uncovered. This can be done by throwing the casing L down on its hinge $l^2$ or the pin n of the lever N may be removed, and both the shutters M, M′ may be left open.

To show independent pictures one at a time and to produce a dissolving effect while the pictures are being changed one to the other, the shutters are in operative position and they are alternately opened and closed. This operation permits one of the pictures to be gradually dissolved into the other as the lenses are closed and unclosed by said shutters.

From the foregoing it will be seen that I have produced an apparatus which with but a single light and a single lantern gives perfect results.

I have discovered that by dispensing with the converging lenses E, E′ I may obtain fairly good results by making the diameter of the projecting lenses substantially the same as that of the picture or slide. In Fig. 5 I have shown diagrammatically, such an arrangement of apparatus. I have also discovered that I may substitute for the projecting lenses the converging lenses, and in Fig. 6 I have shown, diagrammatically, this arrangement.

Where I have used in the specification and claims the term "focus" or "point of focus" it is to be understood that I mean such a point that if a source of light be placed at said point, the rays of light in passing through the condenser will converge to a point on the opposite side of the condenser, as is the case in ordinary projecting lenses heretofore produced, in which a single picture is projected by a single lantern. Such point of focus is indicated on the drawings by x and marked by the reference character 1 on Fig. 1 of the drawings.

I desire it to be understood that the construction herein described and illustrated is merely that selected to exemplify my invention and that the invention is not restricted to the details set forth and may be varied in other respects than those herein set forth without departing from the spirit of the invention or the scope of the subjoined claims.

Having now described my invention, what I claim as new and desire to secure by Letters Patent is:

1. A projecting apparatus, comprising projecting means a single light and a condenser, said light located between the said condenser and the point of focus thereof.

2. In a projecting apparatus, a condenser, converging lenses adjacent to said condenser, and a source of light located between the condenser and the point of focus thereof.

3. In a projecting apparatus, a condenser, a plurality of converging lenses adjacent thereto, a source of light located between the condenser and the point of focus thereof, and a plurality of projecting lenses.

4. In a projecting apparatus, a condenser, a plurality of converging lenses adjacent thereto, a source of light located between the condenser and the point of focus of said condenser, picture carriers located in front of the converging lenses, and projecting lenses in front of said carriers.

5. In a projecting apparatus, a condenser, a plurality of converging lenses adjacent thereto, a source of light located between the condenser and the point of focus of said condenser, picture carriers located in front of the converging lenses, projecting lenses in front of said carriers, and means for alternately covering and uncovering said projecting lenses.

6. In a projecting apparatus, projecting means, a condenser, converging lenses adjacent to the condenser and between the same and the projecting means, means for holding a picture in front of the converging lenses, and a source of light behind the condenser and out of focus therewith.

7. In a projecting apparatus, a condenser, a single source of light back of said condenser and out of focus therewith, a converging lens adjacent to said condenser, a frame for holding a picture in front of said condenser, a projecting lens, and means for alternately covering and uncovering said projecting lens.

8. In a projecting apparatus, a condenser, a source of light back of said condenser and out of focus therewith, a plurality of converging lenses in front of said condenser, a plurality of picture carriers in front of said lenses, a plurality of projecting lenses in front of said carriers, and a single bellows connecting the said converging and projecting lenses.

9. In a projecting apparatus, a composite condenser, consisting of a main condenser and a plurality of converging lenses adjacent thereto, a single source of light behind said condenser and out of focus therewith, a plurality of picture carriers in front of said composite condenser, a plurality of projecting lenses, and a single bellows connecting said projecting lenses and said composite condenser.

10. In a projecting apparatus, a composite condenser, consisting of a main condenser and a plurality of converging lenses adjacent thereto, a single source of light behind said condenser and out of focus therewith, a plurality of picture carriers in front of said composite condenser, a plurality of projecting lenses, a single bellows connecting said projecting lenses and said composite condenser, and means for alternately covering and uncovering the projecting lenses.

11. In a picture projecting apparatus, a lantern, a condenser in front of the lantern, the light in said lantern being out of focus with the condenser, converging lenses in front of the condenser, a bellows, projecting lenses secured to the front of the bellows, a shutter for each of the projecting lenses, and means for alternately moving the shutters.

12. In a picture projecting apparatus, a lantern, a condenser in front of the lantern, the light of the lantern being out of focus with the condenser, converging lenses in front of the condenser, a picture carrier adjacent to each of the converging lenses, a bellows, projecting lenses secured to the front of the bellows, a shutter for each of the projecting lenses, and means for alternately moving the shutters.

13. In a picture projecting apparatus, a lantern, a condenser in front of the lantern, converging lenses adjacent to the said condenser, carriers having overlapping edges adjacent to the converging lenses, a bellows, projecting lenses secured to the front of the bellows, a shutter for each of the projecting lenses, and means for alternately moving the shutters.

14. In a picture projecting apparatus, a lantern, a condenser in front of the lantern, the light of the lantern being out of focus with respect to the condenser, converging lenses adjacent to the condenser, a picture carrier adjacent to each of the said condensing lenses, said carriers having overlapping edges, a bellows, projecting lenses secured to the front of the bellows, a shutter for each of the projecting lenses, and means for alternately operating the shutters.

15. In a projecting apparatus, a condenser, a lantern in the rear of the condenser, the light therein being out of focus with the condenser, converging lenses adjacent to the condenser and having their convex sides next to the condenser, a plurality of picture carriers in front of said converging lenses, projecting lenses in front of said picture carriers, a casing connected to said projecting lenses, said casing having shutters adapted to alternately cover and uncover the projecting lenses, the said casing being so connected to a lens that the casing may be moved from in front of the lenses.

16. In a projecting apparatus, a condenser, a source of light, out of focus with the condenser, a plurality of converging lenses, a plurality of projecting lenses, shutters for said projecting lenses, and means for operating said shutters to alternately cover and uncover the said projecting lenses.

17. In a dissolving view projecting apparatus, a plurality of picture carriers, a projecting lens in front of each carrier, a condenser consisting of double plano-convex lenses, a single source of light, so located in relation to the condenser as to produce substantially parallel rays from the opposite side of the condenser and a plurality of converging lenses arranged between the condenser and said projecting lenses.

18. In a dissolving view picture projecting apparatus, a condenser consisting of double plano-convex lenses, a single source of light so located in relation to the condenser as to produce substantially parallel rays, a plurality of converging lenses, and a plurality of picture carriers located adjacent to the converging lenses.

19. In a picture projecting apparatus, a condenser consisting of double plano-convex lenses, a single source of light back of said condenser and so arranged as to cause parallel rays to be emitted from said condenser, a plurality of converging lenses, a plurality of picture carriers, a plurality of projecting lenses, and means for successively covering a projecting lens when another is uncovered.

20. In a projecting apparatus, a lens, a single source of light back of said lens and so placed in relation thereto as to cause the lens to project substantially parallel rays, a plurality of converging lenses next to the first mentioned lens and adapted to converge the parallel rays, a picture carrier in front of each converging lens, a projecting lens in front of each slide and in the same axial line as the converging lenses, and means for successively covering and uncovering the projecting lenses.

In witness whereof I have hereunto set my hand at the city, county and State of New York, this thirteenth day of July, 1908.

MAXIMILIAN KLAIBER.

In presence of—
ANDREW A. GERNDT,
I. R. RICHARDS.